Patented Mar. 3, 1931

1,795,075

UNITED STATES PATENT OFFICE

JAMES BARRET CROCKETT, OF CAMBRIDGE, MASSACHUSETTS, ASSIGNOR TO CAMBRIDGE RUBBER COMPANY, OF CAMBRIDGE, MASSACHUSETTS, A CORPORATION OF MASSACHUSETTS

MANUFACTURE OF RUBBER FOOTWEAR

No Drawing.  Application filed May 14, 1929.  Serial No. 363,096.

This invention relates to an improved method of manufacturing rubber footwear. More specifically, it relates to a method of producing a rubber shoe, for instance, a bathing shoe, by a dipping process having a novel effect of one color on the inside and another or contrasting color on the outside of the shoe, and it may have a sole or bottom part also formed by a dipping operation which may or may not be of still another color. It also contemplates the article produced by the process.

The objects, briefly stated, are producing by a dipping process a shoe at low cost having contrasting colors on the inside and outside. Another object is to produce a shoe without removing same from the last during manufacture, having a sole of deposited rubber of different physical properties from the deposited rubber in the upper part or body of the shoe.

The body and sole of the shoe are made by dipping a former of the shape desired in an aqueous suspension or dispersion of rubber. A suitable former would be a last of the shape desired of metal, wood, glass, porcelain or any other like material and may be smooth and highly polished or of variated surface with grooves, designs or ornamental patterns raised or sunk in the surface.

The former is successively dipped in an aqueous suspension or dispersion of rubber, removed and dried between coats to the extent necessary or desired until the required thickness of deposited rubber is obtained, when the shoe is then stripped from the former and turned inside out, as hereafter more fully described.

The aqueous suspension of rubber employed may consist of a vulcanizable latex mix, i. e., rubber latex in natural, concentrated, purified, thickened or stabilized form or treated in any way desired, containing vulcanizing ingredients, and an accelerator or accelerators active at normal or at elevated temperatures. Such mixes may contain fillers, reinforcing matter, pigments and colors, to produce the required physical wearing and/or aging properties in the deposited rubber. After the article is formed by dipping in such a vulcanizable latex mix, vulcanization will of course be resorted to at a suitable stage of the process, preferably before stripping from the form, and may be effected at normal or elevated temperatures in dry heat, steam or hot water, or any of the known ways convenient. Alternatively, the article may be formed from a latex mix and vulcanized by the application of sulphur chloride.

The aqueous suspension of rubber may also consist of pre-vulcanized rubber latex such as obtained in following the procedure disclosed in U. S. Patents Nos. 1,443,149 dated January 23, 1923 and 1,682,857 dated September 4, 1928. Such pre-vulcanized latex compounded or not with fillers, pigments, dyes and like material is preferred in most instances on account of the ease and exactness of control of the degree of cure. It may be obtained in stabilized form in the most suitable concentration, viscosity and degree of cure for forming each specific part, thus varying the physical properties of different parts of the shoe and reducing the number of dips required, facilitating handling and further speeding up production by eliminating the step of vulcanization after the article is formed. The properties of the rubber deposited from such pre-vulcanized latex are of the highest order.

Aqueous dispersions of previously coagulated or reclaimed rubber artificially obtained by mechanical and/or chemical means may also be employed where their properties permit, and in either a vulcanized or unvulcanized condition.

The dipping operation may be carried out by hand or by mechanical means and details of dipping, draining and drying are not further referred to as they will be well understood by those skilled in the art.

The body of the shoe is first formed by diping a last in a latex mix of any desired compound containing pigments, dyes, etc. to produce any desired color, and such body may be formed in such height, shape and thickness as has been previously determined. The following coats or the last coat is similarly dipped in another latex mix of any suitable compound to give the required properties in the deposited rubber, but having a different color so as to produce the body of the shoe with one color on the inside and a varying or contrasting color on the outside.

After the body has been formed of the thickness desired and dried, the sole of any suitable material may be attached or may be preferably formed by dipping into another mix of aqueous rubber containing material or compound only so far as it is desired the sole shall extend, the whole or part of the bottom of the former being immersed to the required depth to bring the sole to a predetermined height or only on the bottom of the shoe. The operation may be repeated until the desired thickness is obtained. Usually with an aqueous compound containing rubber and fillers a viscosity may be maintained so that the desired thickness of coating to form a sole for like articles may be obtained in one to three dips. Good wearing and abrasive resistance are desirable for the sole and the herein described method provides a means for varying the properties of the rubber in the sole, body and lining of the shoe by dipping into different compounds, i. e., compounds containing different proportions or kinds of fillers and/or in the case of prevulcanized latex varying degrees of cure. Generally it is desirable to have the sole compound contain a high proportion of mineral fillers to give stiffness, shape and wear in the deposited rubber composition when dried, but the compound used for the sole may of course be the same as the body for some classes of footwear. The sole compound may be the same color as the outside of the body or may be colored differently.

The surplus rubber around the top or edge may be cut away either before or after removal from the former and suitable trimming, beads or designs may be applied. Sometimes it is desirable to improve the qualities of some latex rubbers by extracting all or a part of the water soluble material present in the rubber and where it is found that the properties required are more nearly obtained by this procedure, the finished article may be extracted by treatment in warm or hot water for the periods and at the temperatures found necessary. In any case, the article may be subsequently varnished or given any similar surface treatment.

By means of the steps and process described, a very presentable bathing shoe, for instance, may be produced and a novel and attractive appearance obtained by the contrasting or variated color effects obtained between the inside, the outside and/or the sole or bottom part.

What I claim is:—

1. A process of making rubber footwear which consists in dipping a last into an aqueous rubber containing material of one color to obtain a coating by deposit of said material on the last, dipping the coated last into an aqueous rubber containing material of another color to obtain an exterior coating of different color from the interior and homogeneously merged therewith, and selectively dipping the sole portion into an aqueous rubber containing material having fillers incorporated therewith for increasing the wear resistance of the sole.

2. A process of making rubber footwear which consists in dipping a last into an aqueous rubber containing material of one color to obtain a coating by deposit of said material on the last, dipping the coated last into an aqueous rubber containing material of another color to obtain an exterior coating of different color from the interior and homogeneously merged therewith, and selectively dipping the sole portion into an aqueous rubber containing material of still another color and having fillers incorporated therewith for increasing the wear resistance of the sole.

JAMES BARRET CROCKETT.